US011138839B1

(12) United States Patent
Dunlap

(10) Patent No.: US 11,138,839 B1
(45) Date of Patent: Oct. 5, 2021

(54) METHOD FOR AUTOMATED PEER-TO-PEER WAGER FACILITATION SYSTEM

(71) Applicant: VigZero Holdings LLC, Phoenix, AZ (US)

(72) Inventor: Robert Charles Dunlap, Phoenix, AZ (US)

(73) Assignee: VIGZERO HOLDINGS, LLC, Phoenix, AZ (US)

( * ) Notice: Subject to any disclaimer, the term of this patent is extended or adjusted under 35 U.S.C. 154(b) by 0 days.

(21) Appl. No.: 17/015,396

(22) Filed: Sep. 9, 2020

Related U.S. Application Data

(60) Provisional application No. 62/897,560, filed on Sep. 9, 2019.

(51) Int. Cl.
*G07F 17/32* (2006.01)
*G06Q 50/34* (2012.01)
*G06Q 20/02* (2012.01)
*G06Q 20/10* (2012.01)

(52) U.S. Cl.
CPC ........ *G07F 17/3288* (2013.01); *G06Q 20/02* (2013.01); *G06Q 20/10* (2013.01); *G06Q 50/34* (2013.01); *G07F 17/323* (2013.01); *G07F 17/3244* (2013.01)

(58) Field of Classification Search
USPC ........................................................ 463/25
See application file for complete search history.

(56) References Cited

U.S. PATENT DOCUMENTS

| 5,440,634 | A | 8/1995 | Jones |
| 10,699,527 | B2 * | 6/2020 | Higgins ............. G06Q 20/3223 |
| 2003/0040947 | A1 | 2/2003 | Alie |
| 2004/0160009 | A1 | 2/2004 | Vancura |

(Continued)

FOREIGN PATENT DOCUMENTS

IN 201711020204 12/2018

OTHER PUBLICATIONS

Miru Escrow Systems Source: https://play.google.com/store/apps/details?id=com.mirucoin.user https://mirulabs.io/mes/index.aspx Date Accessed: Apr. 15, 2019.

(Continued)

*Primary Examiner* — Pierre E Elisca
(74) *Attorney, Agent, or Firm* — Booth Udall Fuller, PLC; Kenneth C. Booth

(57) ABSTRACT

A peer-to-peer wager facilitation system comprising a processor communicatively coupled to a storage comprising a gambler library with a plurality of gambler profiles. The processor is configured to receive a wager offer from a first gambler through a network, verify that the first gambler has the first amount of money, and reject the wager offer if the first gambler does not have the first amount of money. The processor is also configured to receive a wager acceptance from a second gambler through the network agreeing to the wager with the first gambler, verify that the second gambler has the second amount of money, and reject the wager acceptance if the second gambler does not have the second amount of money. The processor is configured to transfer the funds into a neutral third-party account, verify the outcome of the wager, and pay the funds to the winning party of the wager.

20 Claims, 8 Drawing Sheets

(56) References Cited

U.S. PATENT DOCUMENTS

| | | |
|---|---|---|
| 2008/0319875 A1 | 12/2008 | Levchin |
| 2009/0089211 A1 | 4/2009 | Morse |
| 2009/0138398 A1 | 5/2009 | Cole |
| 2012/0179558 A1 | 7/2012 | Fischer |
| 2012/0203654 A1 | 8/2012 | Matsuda |
| 2013/0144734 A1 | 6/2013 | Perkins |
| 2014/0279451 A1 | 9/2014 | Saadat |
| 2018/0335875 A1 | 11/2018 | Kerns |
| 2019/0197822 A1* | 6/2019 | Shepherd ............ G07F 17/3225 |
| 2019/0340871 A1* | 11/2019 | Miri .................... G07F 17/3251 |
| 2019/0355211 A1* | 11/2019 | Higgins ................. G06Q 50/34 |
| 2020/0273288 A1* | 8/2020 | Higgins ............... G06Q 20/322 |
| 2020/0402353 A1* | 12/2020 | Higgins .............. G07F 17/3244 |

OTHER PUBLICATIONS

Just Escrow Source: https://play.google.com/store/apps/details?id=m.justescrow.io Date Accessed: Apr. 15, 2019.

Micropayments for Decentralized Currencies Pass, R et al. Proceedings of the 22nd ACM SIGSAC Conference on Computer and Communications Security: 207-218 Publication Date: Oct. 12, 2015.

An Alliance for Escrow Payments Source: https://marketpay.io/use-case/una-alianza-para-los-pagos-en-escrow/ Date Accessed: Apr. 15, 2019.

\* cited by examiner

METHOD FOR AUTOMATED PEER-TO-PEER WAGER FACILITATION SYSTEM

CROSS REFERENCE TO RELATED APPLICATIONS

This application claims the benefit of the filing date of U.S. Provisional Patent Application 62/897,560 entitled "System and Method For Automated Peer-to-Peer Escrow System" to Dunlap that was filed on Sep. 9, 2019, the disclosure of which is hereby incorporated herein by this reference.

TECHNICAL FIELD

Aspects of this document relate generally to methods of supporting peer-to-peer financial escrow transactions, and more specifically to automated peer-to-peer financial escrow transactions that enable financial wagers through an automated electronic payment system that holds participants' wagered funds in a neutral third-party account for later release to the winning party upon the third party's factual determination of the winner of the wager.

BACKGROUND

Currently, when two or more parties want to wager on a potential outcome, such as a sporting event, election outcome, pageant winner, local little-league baseball game, whether a news reporter will wear a red or green tie today, or any other potential outcome, the wagering parties have limited options for handling the financial end of the transaction. The typical way of handling the finances for the wager transaction is that the wagering parties pay the money when the potential outcome is finished and the facts of the outcome are known. This requires the parties to either pay cash or some other legal tender personally or by mail, or transfer funds from the loser to the winner through some electronic payment method such as Venmo or a wire transfer through a bank. With any wager, there is a risk that a party who is unhappy with the outcome of the wager may refuse to pay what was agreed upon after the potential outcome is determined. If the parties know each other well and possibly have exchanged funds in this way before, then the trust level is high and the risk that the loser of the wager will refuse to pay is lower than if the parties do not know each other or are not even geographically near each other. Because the risk and inconvenience of payment increases the farther apart and less familiar the parties are with each other, conventional payment systems discourage wagers between certain classes of people who might otherwise enter into financial wager transactions with each other.

SUMMARY

Aspects of this document relate to a peer-to-peer wager facilitation system comprising a processor communicatively coupled to a network interface, the network interface communicatively coupled to a network, and a storage communicatively coupled to the processor, the storage comprising a gambler library, the gambler library comprising a plurality of gambler profiles including a first gambler profile and a second gambler profile, each of the gambler profiles comprising data concerning personal information about a gambler, wherein the personal information includes electronic funds transfer information, wherein the processor is configured to receive a wager offer through the network interface from a first gambler associated with the first gambler profile, the wager offer comprising a specified event having a set of potential outcomes, a first number indicating a first amount of money the first gambler is willing to pay if the specified event results in a first outcome of the set of potential outcomes, and a second number indicating the odds which the first gambler is willing to apply to the wager offer, verify that the first gambler has at least the first amount of money available by securing the first amount of money using the electronic funds transfer information of the first gambler profile, reject the wager offer if the first gambler does not have at least the first amount of money available, receive a wager acceptance through the network interface from a second gambler associated with the second gambler profile, wherein the second gambler agrees to wager with the first gambler on the specified event, the first number, and the second number in opposition to the first gambler, calculate a second amount of money the second gambler is willing to pay if the specified event results in a second outcome of the set of potential outcomes, wherein the second amount of money is based on the first number and the second number, verify that the second gambler has at least the second amount of money available by securing the second amount of money using the electronic funds transfer information of the second gambler profile, reject the wager acceptance if the second gambler does not have at least the second amount of money available, transfer the first amount of money from the first gambler into a neutral third-party account using the electronic funds transfer information from the first gambler profile, transfer the second amount of money from the second gambler into the neutral third-party account using the electronic funds transfer information from the second gambler profile, receive a notification from the first gambler or the second gambler that the specified event has occurred, verify the outcome of the specified event independent of the first gambler and the second gambler, determine whether the first outcome occurred or the second outcome occurred, release, if the first outcome occurred, the first amount of money and the second amount of money within the neutral third-party account to the second gambler, and release, if the second outcome occurred, the first amount of money and the second amount of money within the neutral third-party account to the first gambler, wherein payment regarding the first amount of money and the second amount of money is guaranteed.

Particular embodiments may comprise one or more of the following features. The second number may default to 1. The processor may further be configured to receive a counter wager offer from the second gambler altering at least one of the specified event, the first number, or the second number. The first amount of money and the second amount of money may be individually each less than or equal to $1,000. To secure the first amount of money, the processor may be configured to place a hold on a credit card of the first gambler. To secure the first amount of money, the processor may be configured to transfer the first amount of money out of a bank account of the first gambler.

Aspects of this document relate to a peer-to-peer wager facilitation system comprising a processor communicatively coupled to a network interface, the network interface communicatively coupled to a network and a storage communicatively coupled to the processor, the storage comprising a gambler library, the gambler library comprising a plurality of gambler profiles including a first gambler profile and a second gambler profile, each of the gambler profiles comprising data concerning personal information about a gambler, wherein the personal information includes electronic funds transfer information wherein the processor is configured to receive a wager offer through the network interface from a first gambler associated with the first gambler profile, the wager offer comprising a specified event having a set of potential outcomes, and a first number indicating a first amount of money the first gambler is willing to pay if the specified event results in a first outcome of the set of potential outcomes, secure the first amount of money using the electronic funds transfer information of the first gambler profile, reject the wager offer if the first gambler does not have at least the first amount of money available, receive a wager acceptance through the network interface from a second gambler associated with the second gambler profile, wherein the second gambler agrees to wager with the first gambler on the specified event and the first number in opposition to the first gambler, the wager acceptance comprising a second amount of money the second gambler is willing to pay if the specified event results in a second outcome of the set of potential outcomes, secure the second amount of money using the electronic funds transfer information of the second gambler profile, reject the wager acceptance if the second gambler does not have at least the second amount of money available, transfer the first amount of money from the first gambler into a neutral third-party account using the electronic funds transfer information from the first gambler profile, transfer the second amount of money from the second gambler into the neutral third-party account using the electronic funds transfer information from the second gambler profile, verify the outcome of the specified event independent of the first gambler and the second gambler, determine whether the first outcome occurred or the second outcome occurred, release, if the first outcome occurred, the first amount of money and the second amount of money within the neutral third-party account to the second gambler, and release, if the second outcome occurred, the first amount of money and the second amount of money within the neutral third-party account to the first gambler.

Particular embodiments may comprise one or more of the following features. The wager offer may further comprise a second number indicating the odds which the first gambler is willing to apply to the wager offer, wherein the second amount of money is calculated based on the first number and the second number. The first amount of money and the second amount of money may be individually each less than or equal to $1,000. The processor may further be configured to receive a notification from the first gambler or the second gambler that the specified event has occurred. Payment regarding the first amount of money and the second amount of money may be guaranteed Aspects of this document relate to a peer-to-peer wager facilitation system comprising a processor communicatively coupled to a network interface, the network interface communicatively coupled to a network, and a storage communicatively coupled to the processor, the storage comprising a plurality of gambler profiles including a first gambler profile and a second gambler profile, each of the gambler profiles having electronic funds transfer information, wherein the processor is configured to receive a wager offer through the network interface from a first gambler associated with the first gambler profile, the wager offer comprising a specified event having a set of potential outcomes, and a first number indicating a first amount of money the first gambler is willing to pay if the specified event results in a first outcome of the set of potential outcomes, secure the first amount of money using the electronic funds transfer information of the first gambler profile, receive a wager acceptance through the network interface from a second gambler associated with the second gambler profile, wherein the second gambler agrees to wager with the first gambler on the specified event and the first number in opposition to the first gambler, the wager acceptance comprising a second amount of money the second gambler is willing to pay if the specified event results in a second outcome of the set of potential outcomes, secure the second amount of money using the electronic funds transfer information of the second gambler profile, transfer the first amount of money from the first gambler into a neutral third-party account using the electronic funds transfer information from the first gambler profile, transfer the second amount of money from the second gambler into the neutral third-party account using the electronic funds transfer information from the second gambler profile, determine whether the specified event resulted in the first outcome or the second outcome, release, if the first outcome occurred, the first amount of money and the second amount of money within the neutral third-party account to the second gambler, and release, if the second outcome occurred, the first amount of money and the second amount of money within the neutral third-party account to the first gambler.

Particular embodiments may comprise one or more of the following features. The first amount of money and the second amount of money may individually be each less than or equal to $1,000. The processor may further be configured to reject the wager offer if the first gambler does not have at least the first amount of money available. The wager offer may further comprise a second number indicating the odds which the first gambler is willing to apply to the wager offer, wherein the second amount of money is calculated based on the first number and the second number. To secure the first amount of money, the processor may be configured to place a hold on a credit card of the first gambler. To secure the first amount of money, the processor may be configured to transfer the first amount of money out of a bank account of the first gambler. The processor may further be configured to verify the outcome of the specified event independent of the first gambler and the second gambler. The processor may further be configured to receive a counter wager offer from the second gambler altering at least one of the specified event and the first number. Payment regarding the first amount of money and the second amount of money may be guaranteed.

The foregoing and other aspects, features, applications, and advantages will be apparent to those of ordinary skill in the art from the specification, drawings, and the claims. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those of ordinary skill in the art from the specification, drawings, and the claims.

BRIEF DESCRIPTION OF THE DRAWINGS

Implementations will hereinafter be described in conjunction with the appended drawings, where like designations denote like elements, and.

DETAILED DESCRIPTION

Figure 1:
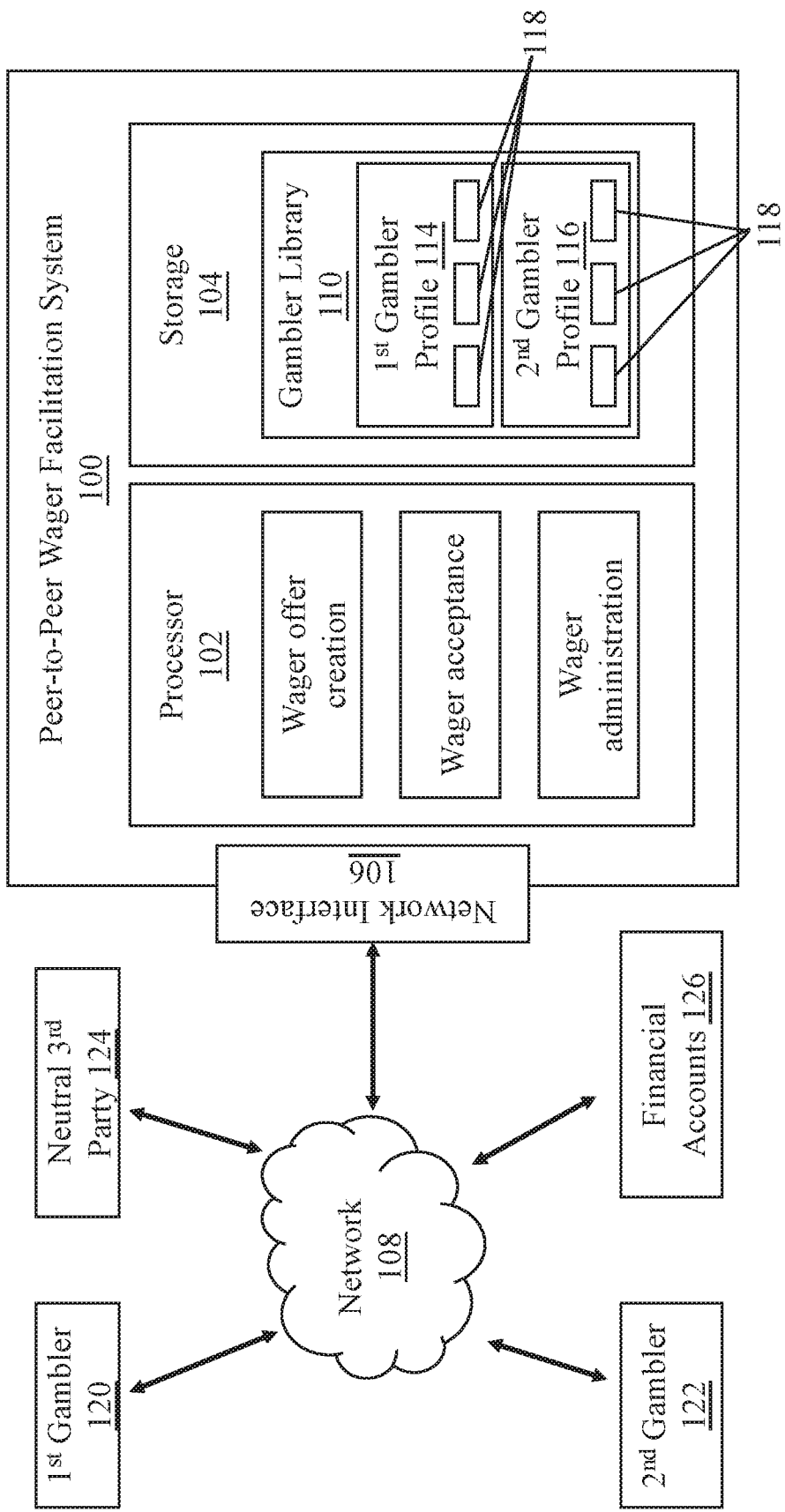
FIG. 1 is a schematic block diagram of an automated peer-to-peer wager facilitation system.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of implementations that are described in many different forms, there is shown in the drawings and will herein be described in detail particular implementations with the understanding that the present disclosure is to be considered as an exemplification of the principles of the disclosed methods and systems, and is not intended to limit the broad aspect of the disclosed concepts to the implementations illustrated.

In the following description, reference is made to the accompanying drawings which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure. As will become apparent, changes may be made in the function and/or arrangement of any of the elements described in the disclosed exemplary implementations without departing from the spirit and scope of this disclosure.

The present disclosure relates to a system and method for managing reliable peer-to-peer transactions that are managed by a neutral third party. For any transaction, whether it be for a wager, or for a payment for a sale of goods or services, there is a risk that the party who intends to receive payment does not receive payment even after the conditions of the transaction have been met. For example, a construction worker may come to a house and perform repair work on the house. After the work is done, the homeowner may refuse to make payment for the work because they do not have the funds to make the payment, disagree about whether the work was completed, or for another reason. The result of this failed transaction, if the parties cannot work out their differences, is that the construction worker is left unpaid. To receive payment, the construction worker would have to file a lien on the property (and receive payment years in the future) or sue the homeowner. Oftentimes, the amount due is less than the cost of the paperwork involved for such solutions.

The same is true of a wager payment. If the losing party in a wager refuses to pay because he doesn't have the money, disagrees with the result, or is just being difficult, the winning party is left with limited options, nearly all of which are almost certainly more than the money owed. Hiring lawyers to prepare contracts and set up bank accounts in advance of the transaction to protect the parties of the transaction is also impractical and too expensive for a simple wager between two individual wagerers. A simple, automated peer-to-peer escrow transaction system would allow ordinary parties to place funds in escrow with a third party to manage payment of the funds to a designated person upon completion of some predetermined conditions. Normally, an escrow account is only used by parties to high value transactions such as the purchase of a house. By permitting parties to have access to an escrow system for small dollar transactions, many more parties can benefit from safe financial transactions in potential outcome transactions. While the following disclosure focuses on a wager facilitation system, the same concepts could be applied to any transaction, whether it be a wager, a small dollar sale of goods, or a small dollar sale of services.

FIG. 1 is a schematic block diagram illustrating an automated peer-to-peer wager facilitation system 100. The wager facilitation system 100 comprises a processor 102 and a storage 104. The processor 102 may be communicatively coupled to a network interface 106 which may, in turn, be communicatively coupled to a network 108. The storage 104 is communicatively coupled to the processor 102. The storage 104 may comprise a gambler library 110, which comprises a plurality of gambler profiles 112, including a first gambler profile 114 and a second gambler profile 116. Each of the plurality of gambler profiles 112 may have data concerning personal information about a gambler, including electronic funds transfer information 118. A first gambler 120 is associated with the first gambler profile 114 and the first gambler profile 114 has data concerning personal information about the first gambler 120. A second gambler 122 is associated with the second gambler profile 116 and the second gambler profile 116 has data concerning personal information about the second gambler 122. The electronic funds transfer information 118 may be a routing number and account number for a bank account belonging to a gambler. In addition, the electronic funds transfer information 118 may be a credit card number belonging to a gambler. Other information that may be required to transfer money from an account or charge an amount of money to an account may also be included in the electronic funds transfer information 118, including information regarding a Venmo account, Paypal account, wire transfer information, or some other method of electronic funds transfer to the neutral third party.

As shown in FIG. 1, the wager facilitation system 100 communicates with the network 108 through the network interface 106. Users of the wager facilitation system 100 such as the first gambler 120, the second gambler 122, and a neutral third party 124 interact with the wager facilitation system 100 through the network 108. In addition, the wager facilitation system 100 is configured to access financial accounts 126 belonging to a gambler through the network 108, using the electronic funds transfer information 118 found within the gambler's profile 112 in the gambler library 110 of the storage 104.

Figure 2:
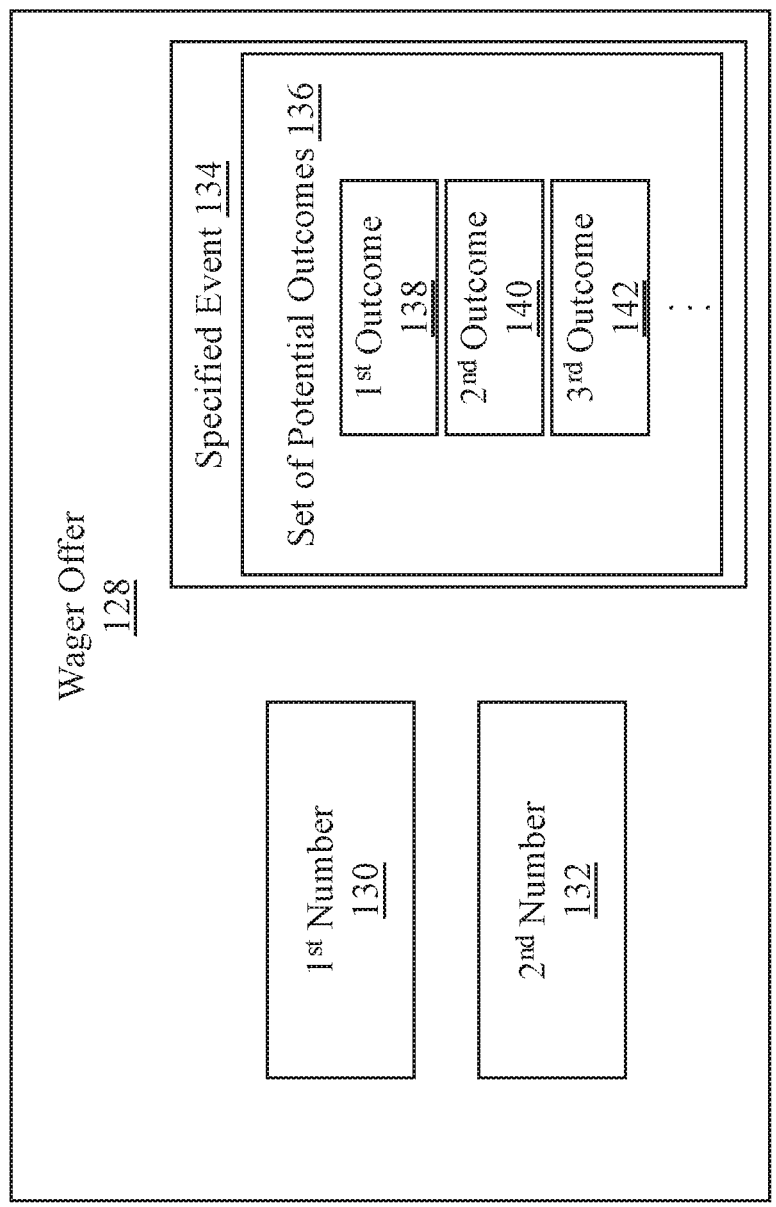
FIG. 2 is a schematic block diagram illustrating the components of a wager offer.

The processor 102 is configured to receive a wager offer 128. As shown in FIG. 2, a wager offer 128 may comprise a first number 130, a second number 132, and a specified event 134. The specified event 134 has a set of potential outcomes 136 including a first outcome 138, a second outcome 140, and a third outcome 142. In an example where the first gambler 120 creates the wager offer 128, the first number 130 may indicate a first amount of money 146 that the first gambler 120 is willing to pay to whoever accepts the wager offer 128 if the specified event 134 results in the first outcome 138. The second number 132 may indicate the odds which the first gambler 120 is willing to apply to the wager offer 128.

For example, if the first gambler 120 wishes to wager with the second gambler 122 on the outcome of a specific game that will be played by a specific sports team, the first gambler 120 may identify the specific game as the specified event 134. The specified event 134 has a set of potential outcomes 136 including a first outcome 138 where the specific sports team loses the specific game and a second outcome 140 where the specific sports team wins the specific game. The first gambler 120 may then indicate a first number 130 that is the first amount of money 146 that the first gambler is willing to pay if the first outcome 138 occurs, i.e. the specific sports team loses the specific game. In addition, the first gambler may indicate a second number 132 that is the odds of the wager. The second number 132 may default to 1 or to some other number. However, if the first gambler 120 feels strongly that the specific sports team will win the specific game, the first gambler may change the second number 132. For example, the first gambler 120 may change the second number 132 to 4. This would mean that the first gambler 120 is willing to pay four times as much money as the second gambler 122 for the wager. Specifically, if the first number 130 was $100 and the second number 132 was 4, then the second amount of money 148 that the second gambler 122 would pay in the event of the second outcome 140 would be $25. Generally, the first amount of money 146 and the second amount of money 148 are individually each less than or equal to $1,000. In other embodiments, the first amount of money 146 and the second amount of money 148 are individually each less than or equal to $10,000, $5,000, $2,000, $500, $200, or $100.

The wager facilitation system 100 is intended to reduce the risk of a party backing out of a transaction after the conditions of the transaction have been met, such as the occurrence of the specified event 134 on which a wager was placed. This risk is reduced by involving the neutral third party 124. The first gambler 120 and the second gambler 122 may access the wager facilitation system 100 using a device capable of connecting to the network 108, such as a computer, tablet, or mobile phone. As will be explained in more detail below, the first gambler 120 and the second gambler 122 can then agree with each other on specific wagers. Gamblers must pay the money involved before the specified event 134 occurs. The money is held by the neutral third party 124 until the specified event 134. The neutral third party 124 then verifies which outcome of the set of potential outcomes 136 was the result and pays the money to the winning party. In this way, the transaction is guaranteed and neither the first gambler 120 nor the second gambler 122 can back out of the wager after finding out that they have lost.

Figure 3:
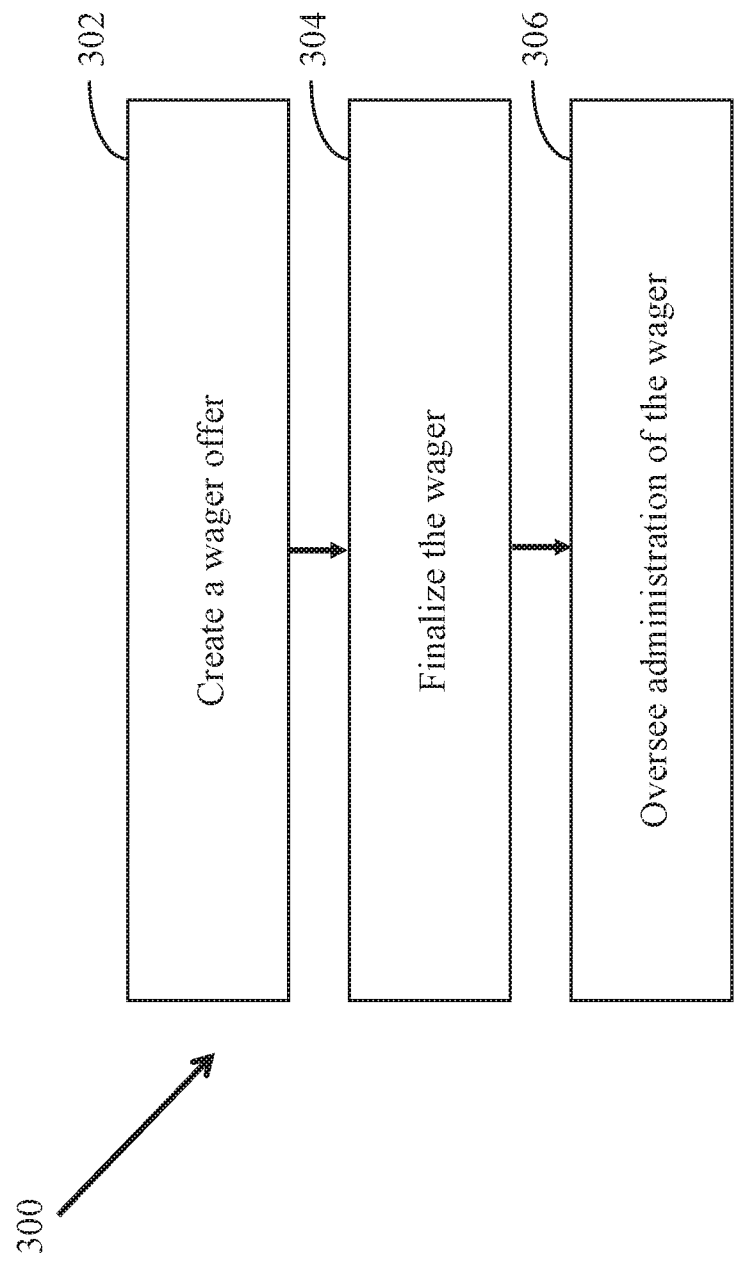
FIG. 3 is a process flow chart showing the general steps of making a wager in an automated peer-to-peer wager facilitation system.
Figure 4:
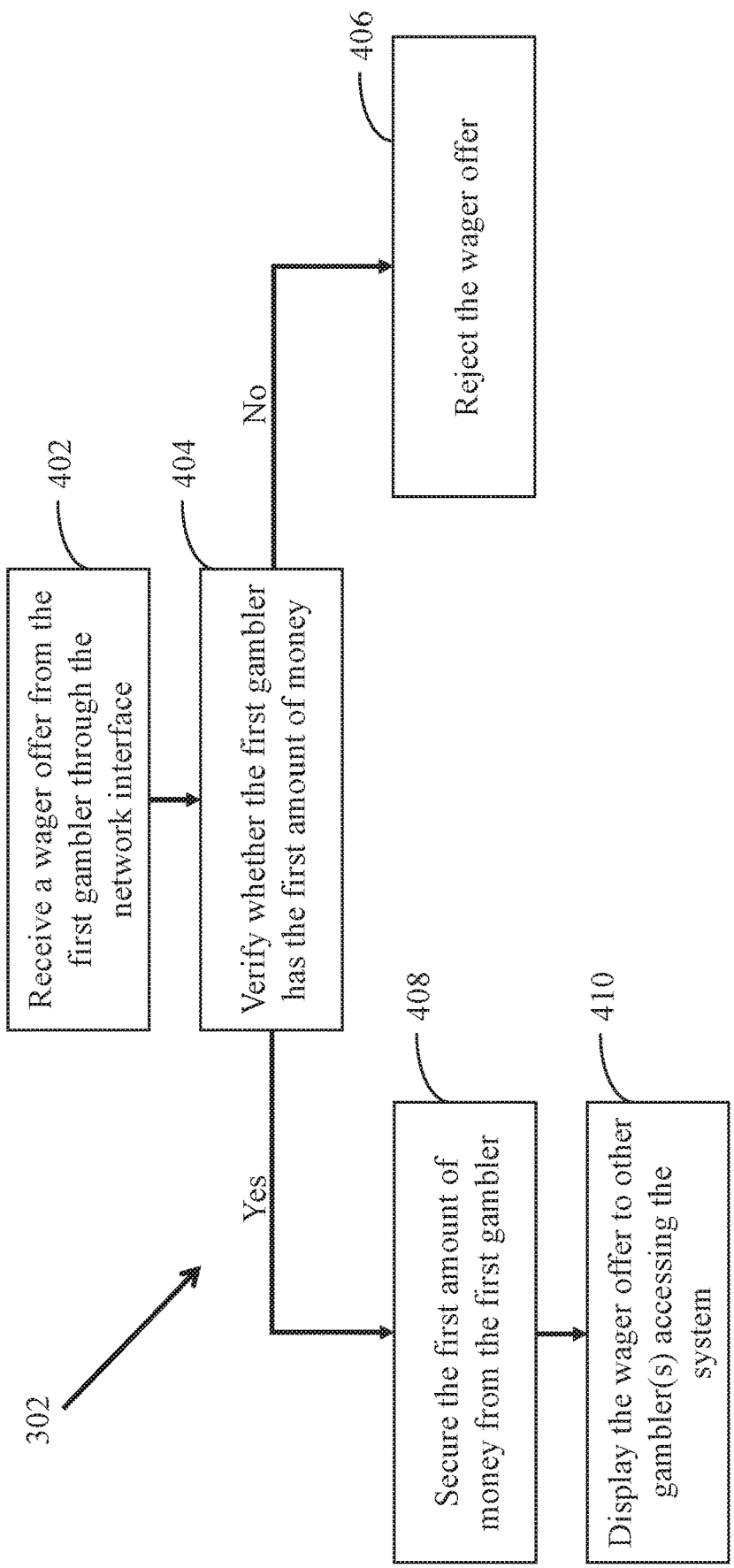
FIG. 4 is a process flow chart showing the steps to create a wager offer from FIG. 3.
Figure 5:
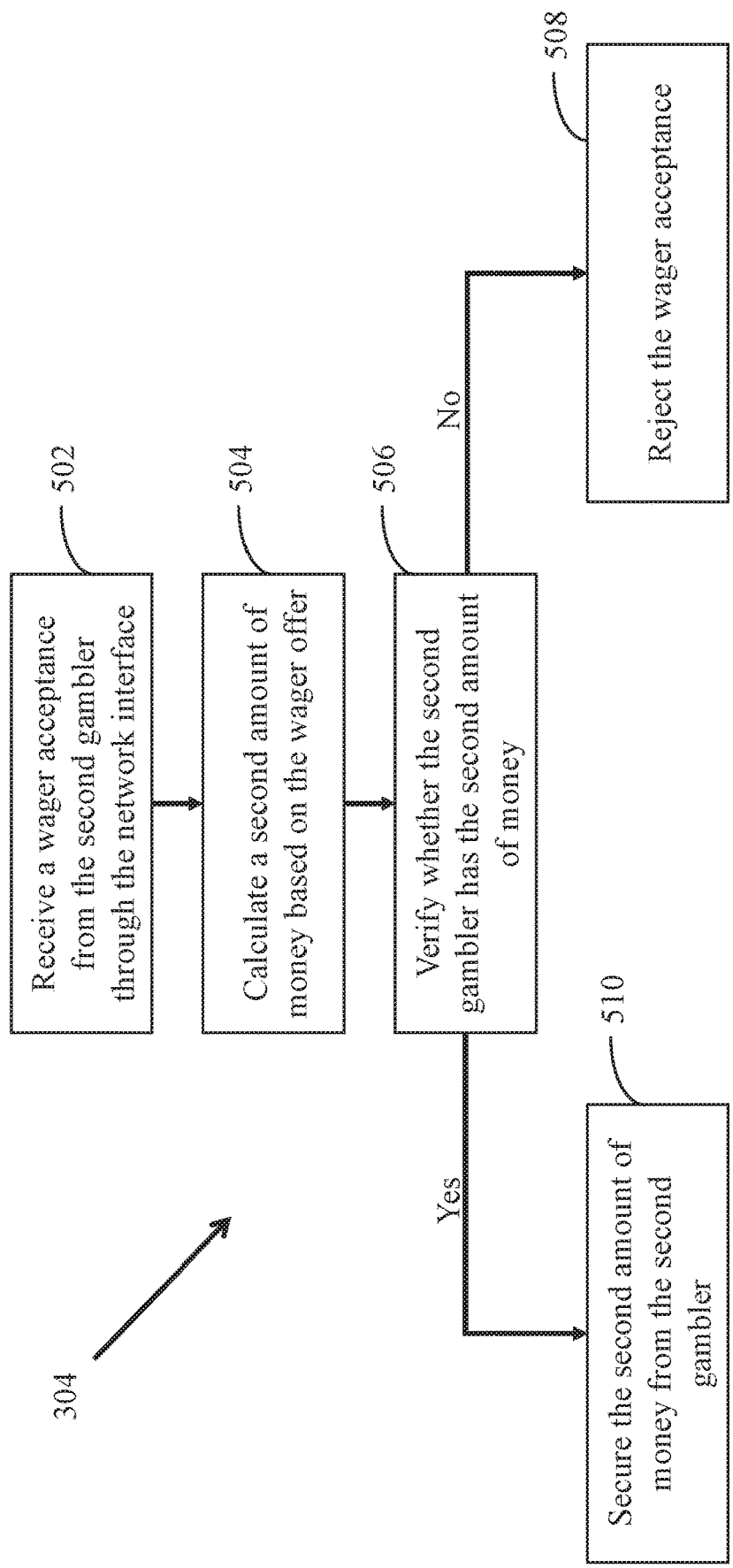
FIG. 5 is a process flow chart showing the steps to finalize a wager from FIG. 3.
Figure 6:
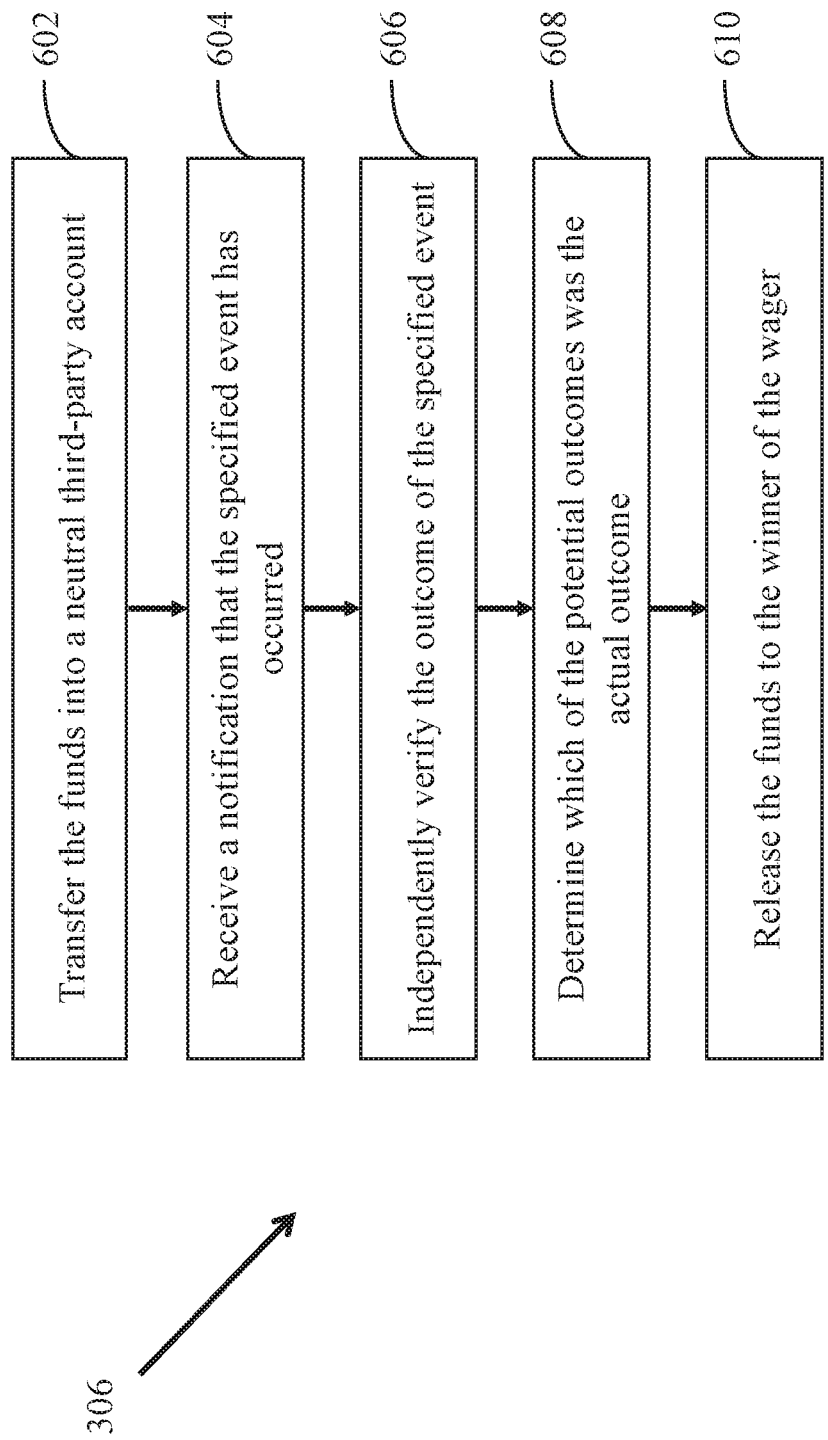
FIG. 6 is a process flow chart showing the steps involved in administering the wager from FIG. 3.

FIG. 3 illustrates process flow chart 300, which shows the general steps of making a wager in an automated peer-to-peer wager facilitation system 100. Such a process comprises a first step 302 of creating a wager offer, a second step 304 of finalizing the wager, and a third step 306 of overseeing the administration of the wager. FIGS. 4-6 illustrate each of these general steps in more detail.

FIG. 4 illustrates more detail of a particular embodiment of the first step 302, the process of creating a wager offer 128. This process is initiated when the first gambler 120 uses a device connected to the network 108 to submit a wager offer 128. The processor 102 is configured to receive the wager offer 128 from the first gambler 120 through the network interface 106 (step 402). The processor 102 may then access the first gambler profile 114 and use the electronic funds transfer information 118 to verify whether the first gambler 120 has sufficient funds available to pay the first amount of money 146 (step 404). This verification may take place by checking the balance of a savings or checking account, or a credit check on a credit card. If the verification indicates that the first gambler 120 does not have sufficient funds to pay the first amount of money 146, the processor 102 may be configured to reject the wager offer 128, or to notify the first gambler that a different payment method is required to continue (step 406). If the verification indicates that the first gambler 120 does have sufficient funds available to pay the first amount of money 146, the processor 102 may be configured to secure the first amount of money 146 from the first gambler 120 using the electronic funds transfer information 118 (step 408). The processor 102 may secure the first amount of money 146 by placing a hold on the first amount of money 146 on a credit card of the first gambler 120. Alternatively, the processor 102 may secure the first amount of money 146 by transferring the first amount of money 146 out of a bank account, a Paypal account, a Venmo account, or some other financial account of the first gambler 120. Once the processor 102 has secured the first amount of money 146 from the first gambler 120, the wager facilitation system 100 may begin to display the wager offer 128 to one or more other gamblers who access the wager facilitation system 100 on a device (step 410).

FIG. 5 illustrates more detail of a particular embodiment of the second step 304, the process of finalizing the wager. The wager offer 128 may be set up to accept only one wager acceptance 144. In such an embodiment, the processor 102 is configured to stop displaying the wager offer 128 once the wager offer 128 has been accepted. In another embodiment, the first gambler 120 may set a specific maximum number of wagers based on any given wager offer 128. In such an embodiment, the processor 102 does not stop displaying the wager offer 128 to other gamblers accessing the wager facilitation system 100 until the wager offer 128 has been accepted the maximum number of times. However, each time the wager offer 128 is accepted, the processor 102 is configured to secure an additional first amount of money 146 in order to ensure that the first gambler 120 has sufficient funds to pay on each of the wagers.

In order to accept the wager offer 128, the second gambler 122 may submit a wager acceptance 144. The wager acceptance 144 indicates that the second gambler 122 agrees to wager with the first gambler 120 on the specified event 134, the first number 130, and the second number 132 in opposition to the first gambler 120. The processor 102 may be configured to receive a wager acceptance 144 from the second gambler 122 through the network interface 106 (step 502). The processor 102 then calculates a second amount of money 148 based on the first number 130 and the second number 132 (step 504). For example, if the first number is $40 and the second number is 2, then the second amount of money 148 would be $20. Although examples provided herein may reference whole numbers, without limitation, fractions of whole numbers are also contemplated. For example, 2.5, 4.5, 0.5, 0.25, and the like may be used to indicate different pay arrangement amounts for the second gambler in the offer.

Once the second amount of money 148 is calculated, the processor 102 is configured to verify that the second gambler 122 has the second amount of money 148 available (step 506). This verification may take place by using the electronic funds transfer information 118 to check the balance of a savings or checking account or running a credit card. If the verification indicates that the second gambler 122 does not have sufficient funds to pay the second amount of money 148, the processor 102 is configured to reject the wager acceptance 144 (step 508). If the verification indicates that the second gambler 122 does have sufficient funds available to pay the second amount of money 148, the processor 102 is configured to secure the second amount of money 148 from the second gambler 122 using the electronic funds transfer information 118 (step 510). The processor 102 may secure the second amount of money 148 by placing a hold on the second amount of money 148 on a credit card of the second gambler 122. Alternatively, the processor 102 may secure the second amount of money 148 by transferring the second amount of money 148 out of a bank account, a Paypal account, a Venmo account, or some other financial account of the second gambler 122.

Instead of simply accepting the wager offer 128, the second gambler 122 may wish to modify one of the parameters of the wager offer 128, such as the first number 130, the second number 132, or the specified event 134. In such a case, the processor 102 is configured to treat the modification as a new wager offer 128 directed at the first gambler 120. The first gambler 120 is given the opportunity to accept the new wager offer 128. If accepted, the wager is treated like a normal wager through the system.

FIG. 6 illustrates more detail of a particular embodiment of the third step 306, the process of overseeing the administration of the wager. Once the first gambler 120 and the second gambler 122 have come to an agreement on the terms of the wager, the processor 102 is configured to use the electronic funds transfer information 118 of the first gambler profile 114 to transfer the first amount of money 146 into a neutral third-party account 150 and the electronic funds transfer information 118 of the second gambler profile 116 to transfer the second amount of money 148 into the neutral third-party account 150 (step 602). Additionally, the processor 102 is configured to receive a notification 152 that the specified event 134 has occurred (step 604). This notification 152 may be generated by the wager facilitation system 100 based on information found online about the occurrence of the specified event 134. Alternatively, the notification 152 may be generated by the first gambler 120 or the second gambler 122. The processor 102 is configured to verify the outcome of the specified event 134 (step 606) and determine which of the potential outcomes 136 was the actual outcome (step 608). The processor 102 may verify the outcome on the internet through the connection to the network 108. Alternatively, the processor 102 may communicate with the neutral third party 124, or with a different neutral third party 124 responsible for reporting the outcome of the specified event 134. Other ways of verifying the outcome of the specified event 134 may be available and are contemplated for incorporation into the verification system. Regardless of the way in which the outcome may be verified, the processor 102 is configured to verify the outcome independent of the first gambler 120 and the second gambler 122 to avoid a biased reporting of the outcome. In another embodiment, verification may occur through polling the first gambler and the second gambler to see if they agree on the outcome of the event. If the first gambler and second gambler agree on the outcome, no further verification may be needed. Regardless of how verification is obtained, once the outcome of the specified event 134 has been determined, the processor 102 is configured to release the first amount of money 146 and the second amount of money 148 within the neutral third-party account 150 to the winner of the wager (step 610). If the first outcome 138 occurred, then the funds are released to the second gambler 122. If the second outcome 140 occurred, then the funds are released to the first gambler 120.

Figure 7:
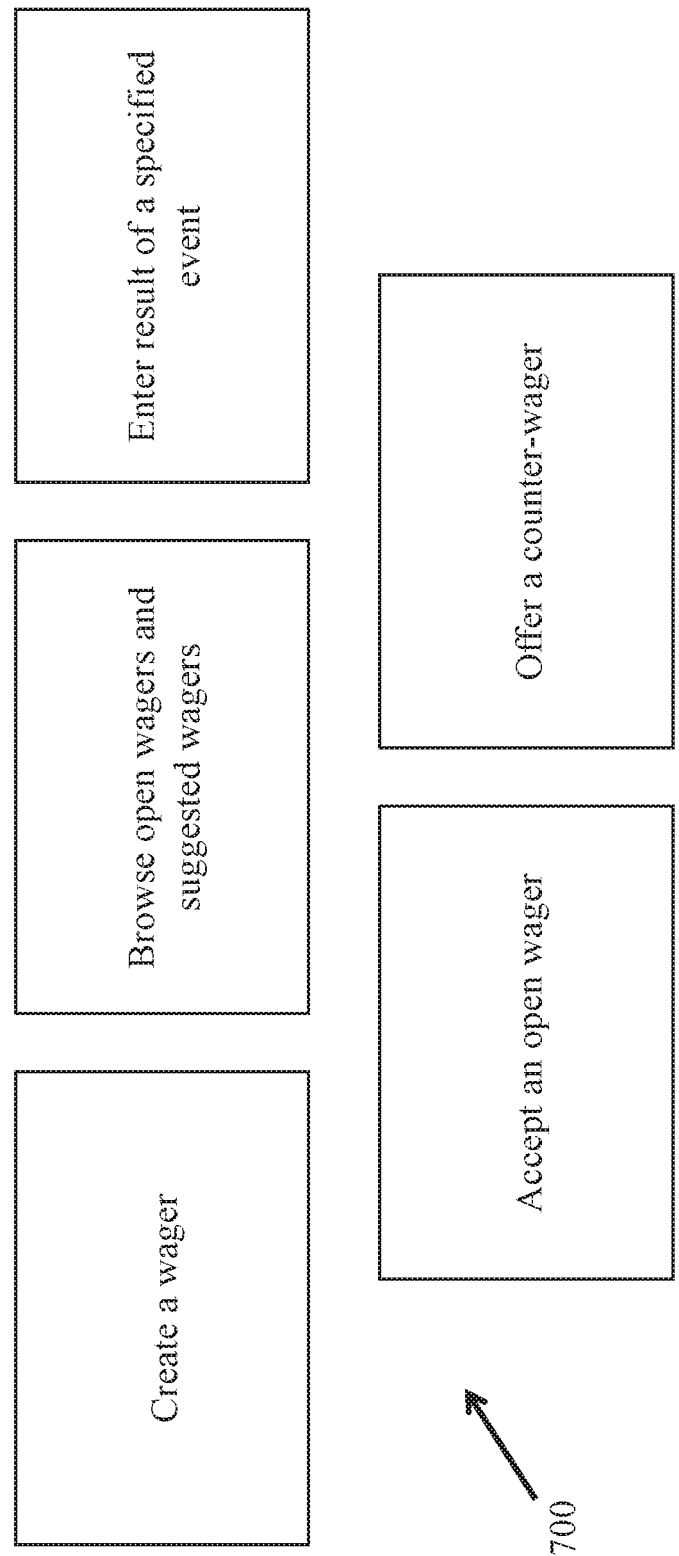
FIG. 7 is a schematic block diagram showing the options that may be presented to a user of an automated peer-to-peer wager facilitation system.

FIG. 7 is a schematic block diagram 700 showing the options presented to a user of an automated peer-to-peer wager facilitation system 100. When a gambler accesses the wager facilitation system 100 either in a phone or computer app, an internet browser, or by some other method, the gambler generally has five or more possible actions. First, the gambler may choose to create a wager as disclosed above in the discussion regarding FIG. 4. Second, the gambler may also choose to browse open wagers and suggested wagers. An open wager is a wager offer 128 where the processor 102 has already verified that the first gambler 120 has at least the first amount of money 146 available. A suggested wager is a set of wager parameters, including a specified event 134, a first number 130, and a second number 132, that the wager facilitation system 100 may suggest to a gambler. The gambler may adopt the suggested wager, converting it into a wager offer 124. Third, the gambler may enter the result of a specified event 134 into the wager facilitation system 100. Such an action triggers a notification 152 to the processor 102 to independently verify the outcome of the specified event 134. Fourth, the gambler may accept an open wager by submitting a wager acceptance 144 to the wager facilitation system 100. Fifth, the gambler may offer a counter-wager to a specific gambler in response to an existing open wager. Other options may also be available to a user of the wager facilitation system 100.

While this disclosure has focused on a wager facilitation system 100, the same principles may be applied to any transaction to simplify the procedures and reduce cost and paperwork for the transaction, while establishing a secure transaction process. For example, for a peer-to-peer services payment, a service provider may search the peer-to-peer escrow system for a services offer they want to accept or may enter a new services offer to provide particular services. A second number 132 may not be needed in many of these transactions, or may be defaulted to 1. Another participant may do the same. When the service provider and a participant have agreed upon a price and conditions for the neutral third party 124 to confirm that the services are complete, one or the other of the parties may initiate an offer. The one accepting the services, if using the peer-to-peer escrow account for pre-confirmed payment, has funds securely deposited into the third-party account by electronic funds transfer. When the work is complete, the participant receiving the services marks the services as complete and the funds are transferred to the service provider. If there is a disagreement and the one receiving the services does not mark the services as completed, the service provider may mark the services as completed and the neutral third party 124 can make a determination as to whether the conditions for releasing the funds are completed.

Figure 8:
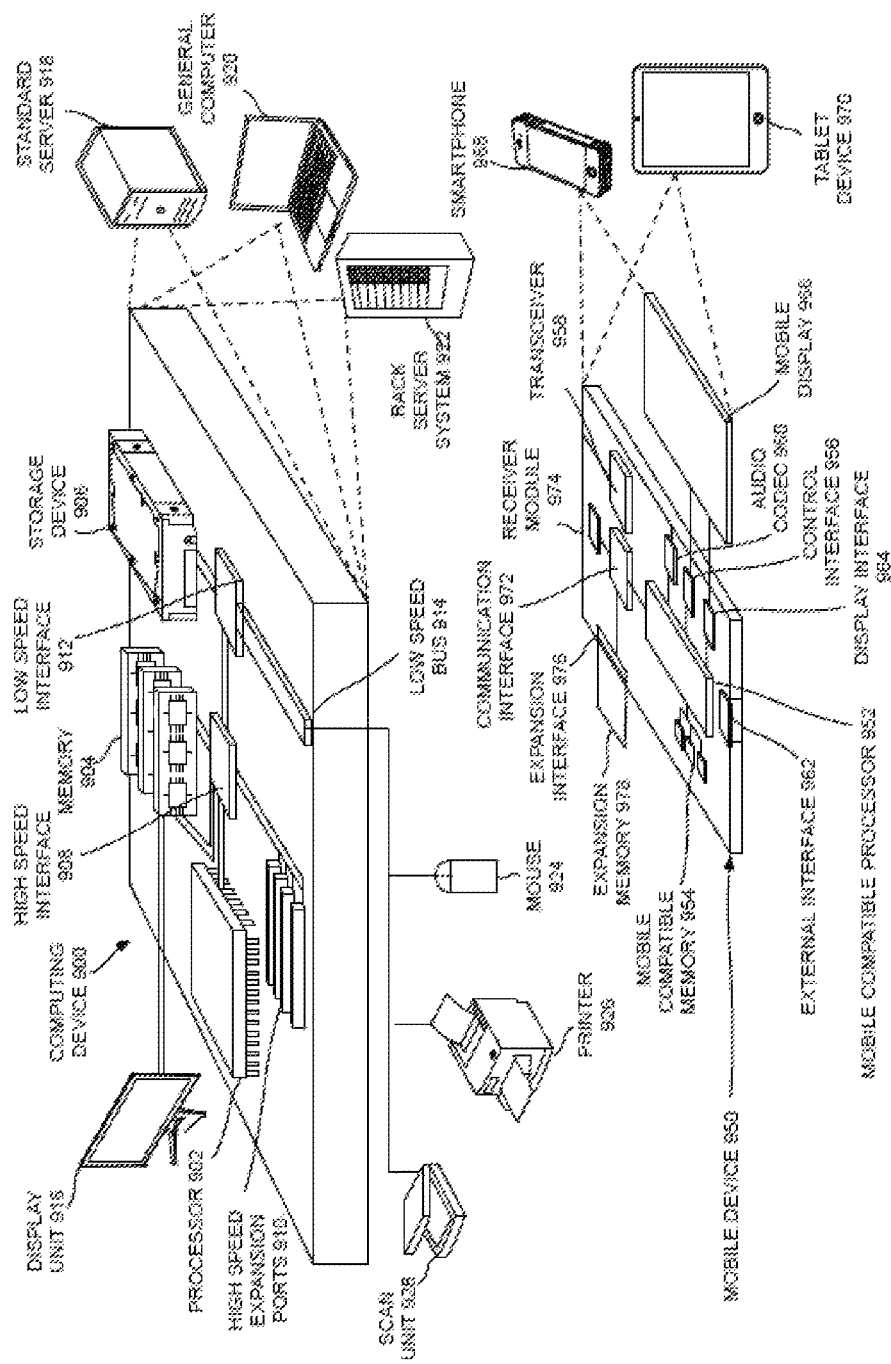
FIG. 8 is a schematic view of a specific computing device that can be used to implement the methods and systems disclosed herein, according to one or more embodiments.

FIG. 8 is a schematic diagram of specific computing device 900 and a specific mobile computing device 950 that can be used to perform and/or implement any of the embodiments disclosed herein. According to various embodiments, the peer-to-peer wager facilitation system 100, the processor 102, the storage 104, the gambler library 110, and/or the neutral third party 124 may be the specific computing device 900.

The specific computing device 900 may represent various forms of digital computers, such as laptops, desktops, workstations, personal digital assistants, servers, blade servers, mainframes, and/or other appropriate computers. The specific mobile computing device 950 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed, according to one embodiment.

The specific computing device 900 may include a processor 902, a memory 904, a storage device 906, a high speed interface 908 coupled to the memory 904 and a plurality of high speed expansion ports 910, and a low speed interface 912 coupled to a low speed bus 914 and a storage device 906. In one embodiment, each of the components heretofore may be inter-coupled using various buses, and may be mounted on a common motherboard and/or in other manners as appropriate. The processor 902 may process instructions for execution in the specific computing device 900, including instructions stored in the memory 904 and/or on the storage device 906 to display a graphical information for a GUI on an external input/output device, such as a display unit 916 coupled to the high speed interface 908, according to one embodiment.

In other embodiments, multiple processors and/or multiple buses may be used, as appropriate, along with multiple memories and/or types of memory. Also, a plurality of specific computing devices 900 may be coupled with, with each device providing portions of the necessary operations (e.g., as a server bank, a group of blade servers, and/or a multi-processor system).

The memory 904 may be coupled to the specific computing device 900. In one embodiment, the memory 904 may be a volatile memory. In another embodiment, the memory 904 may be a non-volatile memory. The memory 904 may also be another form of computer-readable medium, such as a magnetic and/or an optical disk. The storage device 906 may be capable of providing mass storage for the specific computing device 900. In one embodiment, the storage device 906 may be a floppy disk device, a hard disk device, an optical disk device, a tape device, a flash memory and/or other similar solid state memory device. In another embodiment, the storage device 906 may be an array of the devices in a computer-readable medium previously mentioned heretofore, including devices in a storage area network and/or other configurations.

A computer program may be comprised of instructions that, when executed, perform one or more methods, such as those described above. The instructions may be stored in the memory 904, the storage device 906, a memory coupled to the processor 902, and/or a propagated signal.

The high speed interface 908 may manage bandwidth-intensive operations for the specific computing device 900, while the low speed interface 912 may manage lower bandwidth-intensive operations. Such allocation of functions is exemplary only. In one embodiment, the high speed interface 908 may be coupled to the memory 904, the display unit 916 (e.g., through a graphics processor and/or an accelerator), and to the plurality of high speed expansion ports 910, which may accept various expansion cards.

In the embodiment, the low speed interface 912 may be coupled to the storage device 906 and the low speed bus 914. The low speed bus 914 may be comprised of a wired and/or wireless communication port (e.g., a Universal Serial Bus ("USB"), a Bluetooth® port, an Ethernet port, and/or a wireless Ethernet port). The low speed bus 914 may also be coupled to the scan unit 928, a printer 926, a keyboard, a mouse 924, and a networking device (e.g., a switch and/or a router) through a network adapter.

The specific computing device 900 may be implemented in a number of different forms, as shown in the figure. In one embodiment, the specific computing device 900 may be implemented as a standard server 918 and/or a group of such servers. In another embodiment, the specific computing device 900 may be implemented as part of a rack server system 922. In yet another embodiment, the specific computing device 900 may be implemented as a general computer 920 such as a laptop or desktop computer. Alternatively, a component from the specific computing device 900 may be combined with another component in a specific mobile computing device 950. In one or more embodiments, an entire system may be made up of a plurality of specific computing device 900 and/or a plurality of specific computing device 900 coupled to a plurality of specific mobile computing device 950.

In one embodiment, the specific mobile computing device 950 may include a mobile compatible processor 952, a mobile compatible memory 954, and an input/output device such as a mobile display 966, a communication interface 972, and a transceiver 958, among other components. The specific mobile computing device 950 may also be provided with a storage device, such as a microdrive or other device, to provide additional storage. In one embodiment, the components indicated heretofore are inter-coupled using various buses, and several of the components may be mounted on a common motherboard.

The mobile compatible processor 952 may execute instructions in the specific mobile computing device 950, including instructions stored in the mobile compatible memory 954. The mobile compatible processor 952 may be implemented as a chipset of chips that include separate and multiple analog and digital processors. The mobile compatible processor 952 may provide, for example, for coordination of the other components of the specific mobile computing device 950, such as control of user interfaces, applications run by the specific mobile computing device 950, and wireless communication by the specific mobile computing device 950.

The mobile compatible processor 952 may communicate with a user through the control interface 956 and the display interface 964 coupled to a mobile display 966. In one embodiment, the mobile display 966 may be a Thin-Film-Transistor Liquid Crystal Display ("TFT LCD"), an Organic Light Emitting Diode ("OLED") display, and another appropriate display technology. The display interface 964 may comprise appropriate circuitry for driving the mobile display 966 to present graphical and other information to a user. The control interface 956 may receive commands from a user and convert them for submission to the mobile compatible processor 952.

In addition, an external interface 962 may be provide in communication with the mobile compatible processor 952, so as to enable near area communication of the specific mobile computing device 950 with other devices. External interface 962 may provide, for example, for wired communication in some embodiments, or for wireless communication in other embodiments, and multiple interfaces may also be used.

The mobile compatible memory 954 may be coupled to the specific mobile computing device 950. The mobile compatible memory 954 may be implemented as a volatile memory and a non-volatile memory. The expansion memory 978 may also be coupled to the specific mobile computing device 950 through the expansion interface 976, which may comprise, for example, a Single In Line Memory Module ("SIMM") card interface. The expansion memory 978 may provide extra storage space for the specific mobile computing device 950, or may also store an application or other information for the specific mobile computing device 950.

Specifically, the expansion memory 978 may comprise instructions to carry out the processes described above. The expansion memory 978 may also comprise secure information. For example, the expansion memory 978 may be provided as a security module for the specific mobile computing device 950, and may be programmed with instructions that permit secure use of the specific mobile computing device 950. In addition, a secure application may be provided on the SIMM card, along with additional information, such as placing identifying information on the SIMM card in a non-hackable manner.

The mobile compatible memory may include a volatile memory (e.g., a flash memory) and a non-volatile memory (e.g., a non-volatile random-access memory ("NVRAM")). In one embodiment, a computer program comprises a set of instructions that, when executed, perform one or more methods. The set of instructions may be stored on the mobile compatible memory 954, the expansion memory 978, a memory coupled to the mobile compatible processor 952, and a propagated signal that may be received, for example, over the transceiver 958 and/or the external interface 962.

The specific mobile computing device 950 may communicate wirelessly through the communication interface 972, which may be comprised of a digital signal processing circuitry. The communication interface 972 may provide for communications using various modes and/or protocols, such as a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and a General Packet Radio Service ("GPRS") protocol.

Such communication may occur, for example, through the transceiver 958 (e.g., radio-frequency transceiver). In addition, short-range communication may occur, such as using a Bluetooth®, Wi-Fi, and/or other such transceiver. In addition, a GPS ("Global Positioning System") receiver module 974 may provide additional navigation-related and location-related wireless data to the specific mobile computing device 950, which may be used as appropriate by a software application running on the specific mobile computing device 950.

The specific mobile computing device 950 may also communicate audibly using an audio codec 960, which may receive spoken information from a user and convert it to usable digital information. The audio codec 960 may likewise generate audible sound for a user, such as through a speaker (e.g., in a handset smartphone of the specific mobile computing device 950). Such a sound may comprise a sound from a voice telephone call, a recorded sound (e.g., a voice message, a music files, etc.) and may also include a sound generated by an application operating on the specific mobile computing device 950.

The specific mobile computing device 950 may be implemented in a number of different forms, as shown in the figure. In one embodiment, the specific mobile computing device 950 may be implemented as a smartphone 968. In another embodiment, the specific mobile computing device 950 may be implemented as a personal digital assistant ("PDA"). In yet another embodiment, the specific mobile computing device, 950 may be implemented as a tablet device 970.

Various embodiments of the systems and techniques described here can be realized in a digital electronic circuitry, an integrated circuitry, a specially designed application specific integrated circuits ("ASICs"), a piece of computer hardware, a firmware, a software application, and a combination thereof. These various embodiments can include embodiment in one or more computer programs that are executable and/or interpretable on a programmable system including one programmable processor, which may be special or general purpose, coupled to receive data and instructions from, and to transmit data and instructions to, a storage system, one input device, and at least one output device.

These computer programs (also known as programs, software, software applications, and/or code) comprise machine-readable instructions for a programmable processor, and can be implemented in a high-level procedural and/or object-oriented programming language, and/or in assembly/machine language. As used herein, the terms "machine-readable medium" and/or "computer-readable medium" refers to any computer program product, apparatus and/or device (e.g., magnetic discs, optical disks, memory, and/or Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computing device having a display device (e.g., a cathode ray tube ("CRT") and/or liquid crystal ("LCD") monitor) for displaying information to the user and a keyboard and a mouse by which the user can provide input to the computer. Other kinds of devices can be used to provide for interaction with a user as well; for example, feedback provided to the user can be any form of sensory feedback (e.g., visual feedback, auditory feedback, and/or tactile feedback) and input from the user can be received in any form, including acoustic, speech, and/or tactile input.

The systems and techniques described here may be implemented in a computing system that includes a back end component (e.g., as a data server), a middleware component (e.g., an application server), a front end component (e.g., a client computer having a graphical user interface, and/or a Web browser through which a user can interact with an embodiment of the systems and techniques described here), and a combination thereof. The components of the system may also be coupled through a communication network.

The communication network may include a local area network ("LAN") and a wide area network ("WAN") (e.g., the Internet). The computing system can include a client and a server. In one embodiment, the client and the server are remote from each other and interact through the communication network.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

Where the above examples, embodiments and implementations reference examples, it should be understood by those of ordinary skill in the art that other use case, execution environments, and data structures could be intermixed or substituted with those provided. In places where the description above refers to particular embodiments of a peer-to-peer escrow system, it should be readily apparent that a number of modifications may be made without departing from the spirit thereof and that these embodiments and implementations may be applied to other peer-to-peer escrow systems as well. Accordingly, the disclosed subject matter is intended to embrace all such alterations, modifications and variations that fall within the spirit and scope of the disclosure and the knowledge of one of ordinary skill in the art.

What is claimed is:

1. A peer-to-peer wager facilitation system, comprising:
a processor communicatively coupled to a network interface, the network interface communicatively coupled to a network; and
a storage communicatively coupled to the processor, the storage comprising a gambler library, the gambler library comprising a plurality of gambler profiles including a first gambler profile and a second gambler profile, each of the gambler profiles comprising data concerning personal information about a gambler, wherein the personal information includes electronic funds transfer information;
wherein the processor is configured to:
receive a wager offer through the network interface from a first gambler associated with the first gambler profile, the wager offer comprising a specified event having a set of potential outcomes, a first number indicating a first amount of money the first gambler is willing to pay if the specified event results in a first outcome of the set of potential outcomes, and a second number indicating the odds which the first gambler is willing to apply to the wager offer;
verify that the first gambler has at least the first amount of money available by securing the first amount of money using the electronic funds transfer information of the first gambler profile;
reject the wager offer if the first gambler does not have at least the first amount of money available;
receive a wager acceptance through the network interface from a second gambler associated with the second gambler profile, wherein the second gambler agrees to wager with the first gambler on the specified event, the first number, and the second number in opposition to the first gambler;
calculate a second amount of money the second gambler is willing to pay if the specified event results in a second outcome of the set of potential outcomes, wherein the second amount of money is based on the first number and the second number;

verify that the second gambler has at least the second amount of money available by securing the second amount of money using the electronic funds transfer information of the second gambler profile;

reject the wager acceptance if the second gambler does not have at least the second amount of money available;

transfer the first amount of money from the first gambler into a neutral third-party account using the electronic funds transfer information from the first gambler profile;

transfer the second amount of money from the second gambler into the neutral third-party account using the electronic funds transfer information from the second gambler profile;

receive a notification from the first gambler or the second gambler that the specified event has occurred;

verify the outcome of the specified event independent of the first gambler and the second gambler;

determine whether the first outcome occurred or the second outcome occurred;

release, if the first outcome occurred, the first amount of money and the second amount of money within the neutral third-party account to the second gambler; and release, if the second outcome occurred, the first amount of money and the second amount of money within the neutral third-party account to the first gambler;

wherein payment regarding the first amount of money and the second amount of money is guaranteed.

2. The peer-to-peer wager facilitation system of claim 1, wherein the second number defaults to 1.

3. The peer-to-peer wager facilitation system of claim 1, wherein the processor is further configured to receive a counter wager offer from the second gambler altering at least one of the specified event, the first number, or the second number.

4. The peer-to-peer wager facilitation system of claim 1, wherein the first amount of money and the second amount of money are individually each less than or equal to $1,000.

5. The peer-to-peer wager facilitation system of claim 1, wherein, to secure the first amount of money, the processor is configured to place a hold on a credit card of the first gambler.

6. The peer-to-peer wager facilitation system of claim 1, wherein, to secure the first amount of money, the processor is configured to transfer the first amount of money out of a bank account of the first gambler.

7. A peer-to-peer wager facilitation system, comprising:
a processor communicatively coupled to a network interface, the network interface communicatively coupled to a network; and
a storage communicatively coupled to the processor, the storage comprising a gambler library, the gambler library comprising a plurality of gambler profiles including a first gambler profile and a second gambler profile, each of the gambler profiles comprising data concerning personal information about a gambler, wherein the personal information includes electronic funds transfer information;
wherein the processor is configured to:
receive a wager offer through the network interface from a first gambler associated with the first gambler profile, the wager offer comprising a specified event having a set of potential outcomes, and a first number indicating a first amount of money the first gambler is willing to pay if the specified event results in a first outcome of the set of potential outcomes;

secure the first amount of money using the electronic funds transfer information of the first gambler profile;

reject the wager offer if the first gambler does not have at least the first amount of money available;

receive a wager acceptance through the network interface from a second gambler associated with the second gambler profile, wherein the second gambler agrees to wager with the first gambler on the specified event and the first number in opposition to the first gambler, the wager acceptance comprising a second amount of money the second gambler is willing to pay if the specified event results in a second outcome of the set of potential outcomes;

secure the second amount of money using the electronic funds transfer information of the second gambler profile;

reject the wager acceptance if the second gambler does not have at least the second amount of money available;

transfer the first amount of money from the first gambler into a neutral third-party account using the electronic funds transfer information from the first gambler profile;

transfer the second amount of money from the second gambler into the neutral third-party account using the electronic funds transfer information from the second gambler profile;

verify the outcome of the specified event independent of the first gambler and the second gambler;

determine whether the first outcome occurred or the second outcome occurred;

release, if the first outcome occurred, the first amount of money and the second amount of money within the neutral third-party account to the second gambler; and release, if the second outcome occurred, the first amount of money and the second amount of money within the neutral third-party account to the first gambler.

8. The peer-to-peer wager facilitation system of claim 7, the wager offer further comprising a second number indicating the odds which the first gambler is willing to apply to the wager offer, wherein the second amount of money is calculated based on the first number and the second number.

9. The peer-to-peer wager facilitation system of claim 7, wherein the first amount of money and the second amount of money are individually each less than or equal to $1,000.

10. The peer-to-peer wager facilitation system of claim 7, the processor further configured to receive a notification from the first gambler or the second gambler that the specified event has occurred.

11. The peer-to-peer wager facilitation system of claim 7, wherein payment regarding the first amount of money and the second amount of money is guaranteed.

12. A peer-to-peer wager facilitation system, comprising:
a processor communicatively coupled to a network interface, the network interface communicatively coupled to a network; and
a storage communicatively coupled to the processor, the storage comprising a plurality of gambler profiles including a first gambler profile and a second gambler profile, each of the gambler profiles having electronic funds transfer information;

wherein the processor is configured to:
receive a wager offer through the network interface from a first gambler associated with the first gambler profile, the wager offer comprising a specified event having a set of potential outcomes, and a first number indicating a first amount of money the first gambler is willing to pay if the specified event results in a first outcome of the set of potential outcomes;

secure the first amount of money using the electronic funds transfer information of the first gambler profile;

receive a wager acceptance through the network interface from a second gambler associated with the second gambler profile, wherein the second gambler agrees to wager with the first gambler on the specified event and the first number in opposition to the first gambler, the wager acceptance comprising a second amount of money the second gambler is willing to pay if the specified event results in a second outcome of the set of potential outcomes;

secure the second amount of money using the electronic funds transfer information of the second gambler profile;

transfer the first amount of money from the first gambler into a neutral third-party account using the electronic funds transfer information from the first gambler profile;

transfer the second amount of money from the second gambler into the neutral third-party account using the electronic funds transfer information from the second gambler profile;

determine whether the specified event resulted in the first outcome or the second outcome;

release, if the first outcome occurred, the first amount of money and the second amount of money within the neutral third-party account to the second gambler; and release, if the second outcome occurred, the first amount of money and the second amount of money within the neutral third-party account to the first gambler.

13. The peer-to-peer wager facilitation system of claim 12, wherein the first amount of money and the second amount of money are individually each less than or equal to $1,000.

14. The peer-to-peer wager facilitation system of claim 12, the processor further configured to reject the wager offer if the first gambler does not have at least the first amount of money available.

15. The peer-to-peer wager facilitation system of claim 12, the wager offer further comprising a second number indicating the odds which the first gambler is willing to apply to the wager offer, wherein the second amount of money is calculated based on the first number and the second number.

16. The peer-to-peer wager facilitation system of claim 12, wherein, to secure the first amount of money, the processor is configured to place a hold on a credit card of the first gambler.

17. The peer-to-peer wager facilitation system of claim 12, wherein, to secure the first amount of money, the processor is configured to transfer the first amount of money out of a bank account of the first gambler.

18. The peer-to-peer wager facilitation system of claim 12, wherein the processor is further configured to verify the outcome of the specified event independent of the first gambler and the second gambler.

19. The peer-to-peer wager facilitation system of claim 12, wherein the processor is further configured to receive a counter wager offer from the second gambler altering at least one of the specified event and the first number.

20. The peer-to-peer wager facilitation system of claim 12, wherein payment regarding the first amount of money and the second amount of money is guaranteed.

* * * * *